Figure 4:
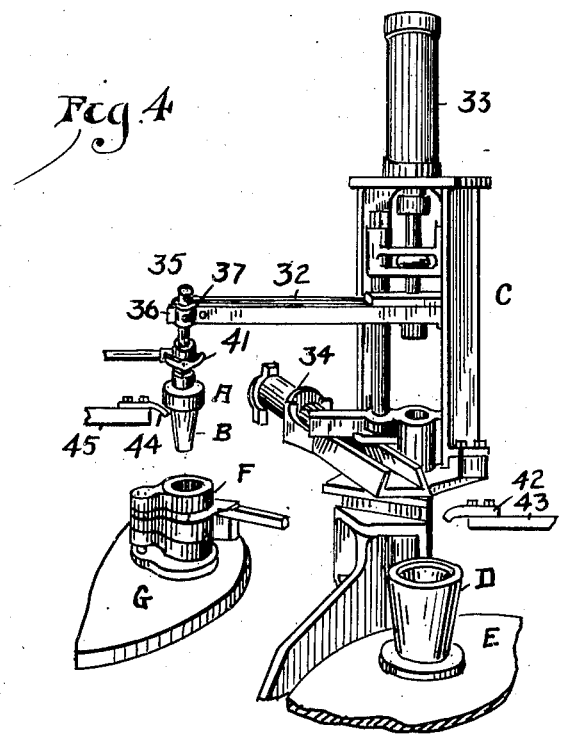

April 7, 1925.
W. J. MILLER
1,532,255
MEANS FOR TRANSPORTING GLASS ARTICLES
Original Filed Nov. 21, 1921    2 Sheets-Sheet 1
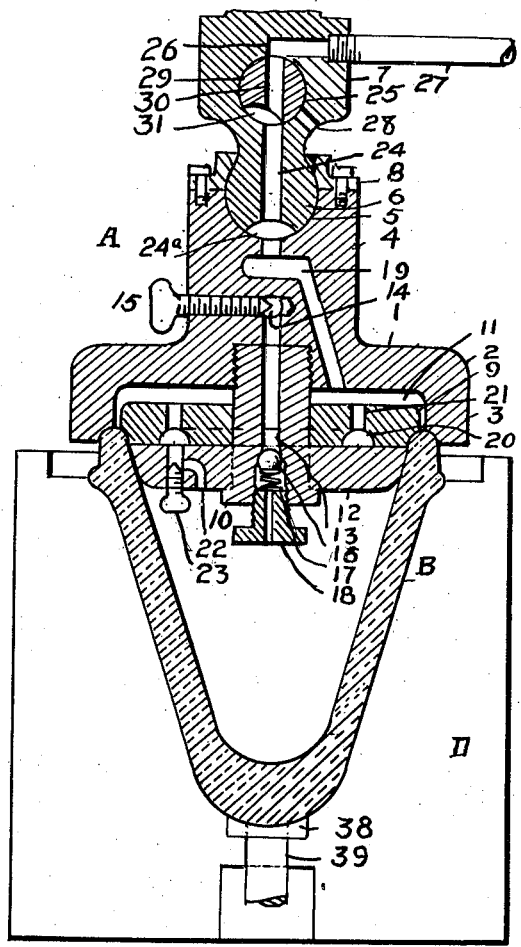
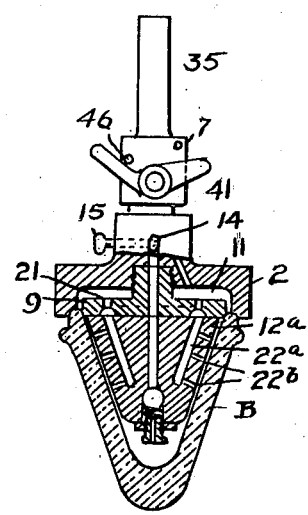
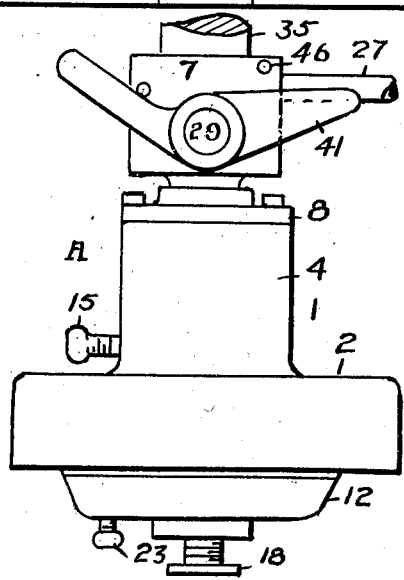

April 7, 1925.  1,532,255
W. J. MILLER
MEANS FOR TRANSPORTING GLASS ARTICLES
Original Filed Nov. 21, 1921  2 Sheets-Sheet 2

Patented Apr. 7, 1925.

1,532,255

UNITED STATES PATENT OFFICE.

WILLIAM J. MILLER, OF SWISSVALE BOROUGH, PENNSYLVANIA.

MEANS FOR TRANSPORTING GLASS ARTICLES.

Application filed November 21, 1921, Serial No. 516,646. Renewed October 20, 1924.

*To all whom it may concern:*

Be it known that I, WILLIAM J. MILLER, a citizen of the United States, and residing in the borough of Swissvale, in the county of Allegheny and State of Pennsylvania, have invented or discovered the new, useful, and Improved Means for Transporting Glass Articles, of which the following is a specification.

My invention consists in a vacuum grip device for use in connection with the transfer and take off mechanisms of glass fabricating machines, and for similar purposes.

Transfer mechanisms, which are used to transfer the parisons or blanks from the blank molds to the blow molds, and take off mechanisms, which are used to remove the finished ware from the blow molds, are provided with mechanically operated jaws or fingers which close upon and thus grip the glass articles.

The working of these mechanical gripping devices is not entirely satisfactory for a number of reasons. Among the latter may be mentioned the following. The fingers or jaws must be nicely adjusted, and frequently inspected to see that they do not get out of adjustment; since if their grasp is not sufficient the glass articles will be dropped or will be suspended at an angle to the vertical, and if they grip the article with too much force, the article may be dented or distorted, or there may be difficulty in dropping the article at the desired point or in the proper manner. Again where, as is often the case, the article is unprovided with a pronounced top lip or shoulder, it is very difficult to grasp the article without danger of its slipping or of denting or crushing it. Again, it sometimes happens that the article to be lifted out of the mold is imperfect or incomplete, owing, perhaps to an insufficient amount of glass in the gather or some defect in the fabricating; so that the mechanical fingers or jaws are unable to take proper hold.

The object which I have in view is the provision of automatic gripping means for the purposes described which will positively and reliably seize the article to be transferred, taken off or otherwise moved; will retain hold on the same in transit, and will release the same at the proper moment, without denting or crushing the article, and handle an imperfect or incomplete article with the same facility and positiveness as in the case of a perfect article.

I effect this object by the provision of a vacuum gripper or gripping device which is automatically operated. Means are provided whereby when the gripper is brought into engagement with the article to be moved, the vacuum is automatically applied to the article, thereby positively attaching it to the gripper, and when the article has been brought into the proper position, the vacuum is automatically broken and the article released from the gripper.

Merely for the sake of illustrating the operation of the principles of my invention, I have shown the same applied to a fluid pressure operated transfer mechanism of the type shown and described in Letters Patent of the United States No. 1515962 issued to me November 18, 1924, but it will be fully understood that I do not wish thereby to limit the scope of my invention.

Figure 5:
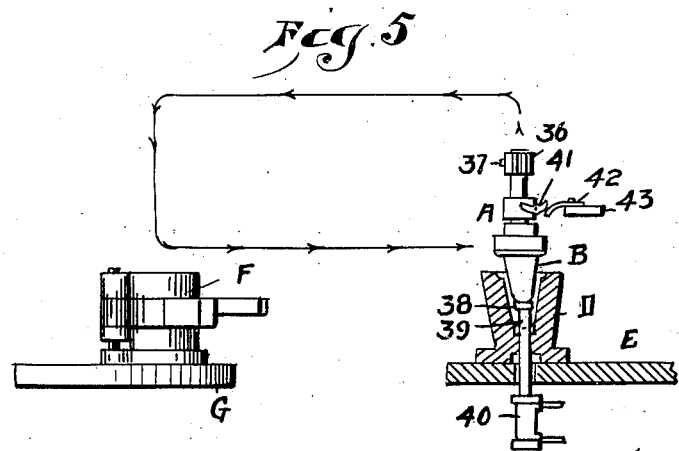

In the accompanying drawings, Fig. 1 is an enlarged vertical section of a gripper, embodying the principles of my invention, in gripping engagement with a parison in the blank mold in which it was formed; Fig. 2 is an elevation of the gripper on reduced scale; Fig. 3 is a view on still smaller scale, partially in elevation and partially in vertical section showing a slightly modified form of the gripper which is in this case especially adapted to grip imperfect parisons or glass articles; Fig. 4 is an elevation showing my improved gripper mounted on a transfer device of the character mentioned above and in use to transfer parisons from the blank molds to the blow molds of a double table machine, and Fig. 5 is a diagrammatic view showing approximately the path of travel of the gripper shown in Fig. 4 in completing a cycle of operation.

The following is a detailed description of the drawings, reference being first had to Figs. 1 and 2.

My vacuum gripper A is illustrated as of the following advantageous construction. 1 is a casting having a circular lower portion or head 2 provided with a depending edge flange 3 whose inner edge is recessed to fit upon and around the top edge of the parison or other glass article, B. The casting 1 is also provided with an upwardly extending, axial stock 4 having a semi-circular recess or seat 5 in its upper end to receive the accurately fitting ball 6 formed on the lower end of a block 7. 8 represents a split or two-part ring which fits over the ball 6 and is bolted to the top of the stock 4, thus flexibly coupling the casting 1 to the block 7.

9 is a circular plate mounted within, and spaced slightly from, the flange 3 by means of its threaded annular stem 10 which is screwed into an axial hole in the casting. A space or chamber 11 is thus formed between the plate 9 and the head 2 having an annular opening at its perimeter. The lower edge of the plate 9 is recessed to fit against the inner top edge of the parison B. 12 is a circular plate having its perimeter contoured to fit the interior wall of parison B below the plate 9, and said plate is bolted or otherwise secured snugly up against the plate 9.

An axial bore 13 extends through the plates 12 and 9 and into the lower portion of the stock 4 where it connects with a passage 14 extending radially through said stock to atmosphere.

An adjustment screw 15 is provided to regulate the capacity of the passage 13—14.

The lower end of the bore 13 is counterbored to provide a seat for the downwardly opening ball valve 16 resiliently held in its seat by the spring 17 whose power may be adjusted by the bushing 18 screwed into the threaded end of the bore 13.

19 is a passage leading through the material of the casting 1 from the chamber 11 to the ball seat 5. 20 is an annular concentric groove in the lower face of the plate 9 and which is connected with the chamber 11 by the passages 21. 22 represents one or more passages through the plate 12 connecting with the groove 20, and 23 represents adjustment screws whereby the capacity of said passages 22 may be regulated.

24 is an axial passage in the block 7 leading from the lower end of the ball 6 to a transversely disposed valve seat 25, and 26 is a second, L-shape passage in the block 7 leading from the valve seat 25, at a point diametrically opposite passage 24, to a threaded port in the side of said block 7 to which is connected the flexible hose 27 which extends to a vacuum pump or other source of vacuum, not shown. The lower end of the passage 24 is flared, as at 24ª so as to be always in communication with the passage 19.

28 is a passage through the block 7 connecting the valve seat 25 to atmosphere, or, if desired, superatmospheric pressure.

29 is a rotary valve plug in the seat 25, held tightly therein by any well known means. Said plug is provided with a diametric passage 30 which, when the valve is in the position shown in Fig. 1, connects the passages 24 and 26; and it is also provided with a peripheral recess 31 which when the valve is turned counterclockwise from its position shown in Fig. 1, will connect the passages 24 and 28.

It is evident that, with the valve 29 in the position shown in Fig. 1, when the gripper engages a parison or other article, as shown, the vacuum would hold the parison in secure engagement with the gripper so that it may be lifted from its mold and moved into any desired location. It is also evident that when the valve 29 is turned so that the communication is interrupted between the passages 24 and 26 and the passage 24 connected to atmosphere or pressure through the passage 28, the vacuum will be broken and the parison will be released.

The ball valve 16 is adjusted so that in case the vacuum becomes excessive, possibly tending to partially collapse the parison, the valve will automatically open long enough to reduce the vacuum to the desired amount. The amount of air thus entering may be nicely regulated by the screw 15. Thus the vacuum may be regulated to suit the character of the articles which are to be moved. A further regulation of the vacuum may be obtained by means of the screws 23. The ball and socket connection between the casting 1 and the suspension block 7 provides the necessary flexibility in the gripper to enable it to properly engage the ware, even if the parison as presented is not properly alined.

It will be understood that the engaging surfaces of the gripper should fit the article to be engaged and lifted, and therefore their contours will be dictated by the contour of such articles. Therefore when the fabricating machine is to work on a given article, the gripper is provided with a head and plates with gripping or engaging surfaces of the proper contour, according to the size of the article, and whether it is round, oval or square.

Frequently I find it advantageous to provide vacuum engaging surfaces which extend down into the article and engage the interior walls of the latter; thus insuring a secure grip on the article, even if its top edge is incomplete owing to insufficient glass or some fault in fabrication, or where the article is intentionally given an irregular top edge as for the purpose of ornamentation.

Thus, in Fig. 3, I show substituted for the plate 12, a depending block 12ª secured to the plate 9, and fitting in the interior of the parison B, said block 12ª being provided with a plurality of downwardly extending passages 22ª from which a plurality of small passages 22ᵇ lead to the perimeter of the block 12ª, thus providing an ample suction grip on the parison B.

In use, the vacuum gripper is mounted upon any suitable mechanism for lowering the gripper into engagement with the article to be seized, and for transporting the gripper with its burden to the point where the latter is to be deposited, suitable means being provided for turning on the vacuum and for interrupting the same at the proper points.

Thus, in Fig. 4 I have shown the gripper mounted on the arm 32 of the transfer mechanism C which is shown used to transport the parisons B from the blank molds D on the rotary table E to the blow molds F on the rotary table G. A fluid pressure cylinder 33 raises and lowers the arm 32, while a second fluid pressure cylinder 34 swings the arm 32 back and forth between the mold tables. The gripper A is shown secured to the arm 32 by means of an integral stem 35 extending up from the block 7 and held in a collar 36 in the transfer arm 32 by means of a set screw 37.

In practice when a blank mold D is in the transfer position shown in Fig. 5, the parison B is raised so as to protrude slightly above the mold, as shown in Fig. 5. Thus the mold bottom 38 is shown engaged from below by the piston rod 39 of a fluid pressure cylinder 40 when the mold is spotted in the transfer position, thus raising the mold bottom and elevating the parison into engagement with the gripper.

In the embodiment shown, the gripper moves approximately in the path indicated by the arrowed line in Fig. 5, being positioned above the transfer position of the blank forming mechanism as a blank mold moves into the transfer position. Then the parison is moved upwardly into engagement with the gripper. The vacuum is on and therefore the gripper seizes the parison. The gripper is then elevated and moved over above the transfer position of the blowing or finishing mechanism and as the finishing mold reaches the transfer position, the gripper descends until the parison is inserted partially, and preferably almost entirely into the blow mold when the vacuum is broken and the parison is released and drops into the mold. As the tables resume their rotation, the gripper moves over toward its first described position over the blank mold table.

If desired the gripper may be lowered into engagement with the parison, instead of raising the parison into engagement with the gripper.

To throw valve 29 at the proper moments I provide the protruding stem of the valve with a winged cross head 41. As the gripper A moves into the position shown in Fig. 5, the right end of the cross head 41 strikes against a finger 42 supported by a bracket 43, extending from the axial standard upon which the table E rotates, while a similar finger 44 is supported by a bracket 45 from the standard of the table G in such position that, as the gripper A descends to insert the parison into the blow mold, said finger is struck by the left hand end of the cross head 41, thus reversing the valve and breaking the vacuum.

Stops 46 are preferably provided on the block 7 to limit the movement of the valve in either direction, so that it will not be turned too far.

It is of course evident, that, if desired, the valve or other device for establishing and breaking the vacuum may be placed in the hose or pipe 27 and be operated by any convenient means.

The means of adjusting the amount of vacuum may also be applied to the vacuum supply instead of being placed on the gripper as shown.

Many other changes in structural embodiment will suggest themselves to those skilled in the art, without departing from the scope of my invention.

Although, for the sake of clear understanding of the principles of my invention I have minutely described the embodiment of the same illustrated in the drawings, I do not wish to limit myself thereby, but claim broadly:—

1. In combination with mechanism for transporting hollow articles of glass, a vacuum gripper for said mechanism comprising a member contoured to circumferentially fit the wall of the article from without, a second member mounted in unison therewith and contoured to fit the wall of the article from within, said members being spaced apart to form a chamber which is closed by the article when the gripper engages an article, and means for applying a vacuum to said chamber.

2. In combination with mechanism for transporting hollow articles of glass, a vacuum gripper for said mechanism comprising a member contoured to circumferentially fit the wall of the article from without, a second member mounted in unison therewith and contoured to fit the wall of the article from within, said members being spaced apart to form a chamber which is closed by the article when the gripper engages an article, and means automatically actuated in unison with the operation of said mechanism for alternately applying vacuum to said chamber to grip the article and for breaking said vacuum to release the article after the same has been transported.

3. In combination with mechanism for transporting hollow articles of glass, a vacuum gripper for said mechanism comprising a member provided with an enclosed depending flange contoured to circumferentially fit the wall of the article from without, a second member mounted in unison with said first member and having a perimetral edge contoured to fit the wall of the article from within, a chamber being provided between said members, which chamber is closed by the article when engaged by the gripper, and means for applying vacuum to said member.

4. In combination with mechanism for transporting hollow articles of glass, a vacuum gripper for said mechanism comprising a member provided with an enclosed depending flange contoured to circumferentially fit the wall of the article from without, a second member mounted in unison with said first member and having a perimetral edge contoured to fit the wall of the article from within, a chamber being provided between said members, which chamber is closed by the article when engaged by the gripper, and means automatically actuated in unison with the operation of said mechanism for alternately applying vacuum to said chamber to grip the article and for breaking said vacuum to release the article after it has been transported.

5. In combination with mechanism for transporting hollow articles of glass, a vacuum gripper for said mechanism characterized by a depending flange contoured to circumferentially fit the wall of the article from without, a perimetral surface contoured to fit the wall of the article from within, an interior chamber communicating with the space between said flange and said surface, and means for applying vacuum to said chamber, said chamber being closed by the article when engaged by the gripper.

6. In combination with mechanism for transporting hollow articles of glass, a vacuum gripper for said mechanism characterized by a depending flange contoured to circumferentially fit the wall of the article from without, a perimetral surface contoured to fit the wall of the article from within, an interior chamber communicating with the space between said flange and said surface, and means automatically actuated in unison with the operation of said mechanism for alternately applying vacuum to said chamber to grip the article and for breaking said vacuum to release the article after the same has been transported, the article closing said chamber when engaged by said gripper.

7. In combination with mechanism for transporting hollow articles of glass, a vacuum gripping means for said mechanism comprising a closure for the open end of the article, and means for applying vacuum to the interior of the article when said closure is in position.

8. In combination with mechanism for transporting hollow articles of glass, a vacuum gripping means for said mechanism comprising a closure for said open end of the article, means for applying vacuum to the interior of the article when said closure is in position, and means for adjusting the degree of vacuum to prevent the collapse of the article.

9. In combination with mechanism for transporting hollow articles of glass, a vacuum gripping member carried by said mechanism and adapted to fit into the interior of said article, said member being chambered and provided with openings connecting its chambered interior with its article engaging surface, and means for applying vacuum to the chambered interior of said member whereby the article is caused to adhere to the same.

10. In combination with mechanism for transporting hollow articles of glass, a vacuum gripping member carried by said mechanism and adapted to fit into the interior of said article, said member being chambered and provided with openings connecting its chambered interior with is article engaging surface, means for applying vacuum to the chambered interior of said member whereby the article is caused to adhere to the same, and means for adjusting the vacuum to prevent the collapse of the article.

11. In combination with mechanism for transporting hollow articles of glass, a vacuum gripper for said mechanism provided with a depending flange contoured to fit the wall of the article from without and the surface contoured to fit the wall of the article from within, said member being provided with an interior chamber in communication with the space between said flange and said surface, which space is closed by the article when engaged by the gripper, said chamber being in communication with the interior of the article, and means for applying vacuum to said chamber.

12. In combination with mechanism for transporting hollow articles of glass, a vacuum gripper for said mechanism provided with a depending flange contoured to fit the wall of the article from without and the surface contoured to fit the wall of the article from within, said member being provided with an interior chamber in communication with the space between said flange and said surface, which space is closed by the article when engaged by the gripper, said chamber being in communication with the interior of the article, means for applying vacuum to said chamber, and means for regulating the degree of vacuum to prevent the collapse of the article.

Signed at Pittsburgh, Pa. this 3rd day of June, 1921.

WILLIAM J. MILLER.